June 26, 1934.     G. F. WIKLE     1,964,445
BEAD FORMING APPARATUS
Filed March 6, 1933     6 Sheets-Sheet 1
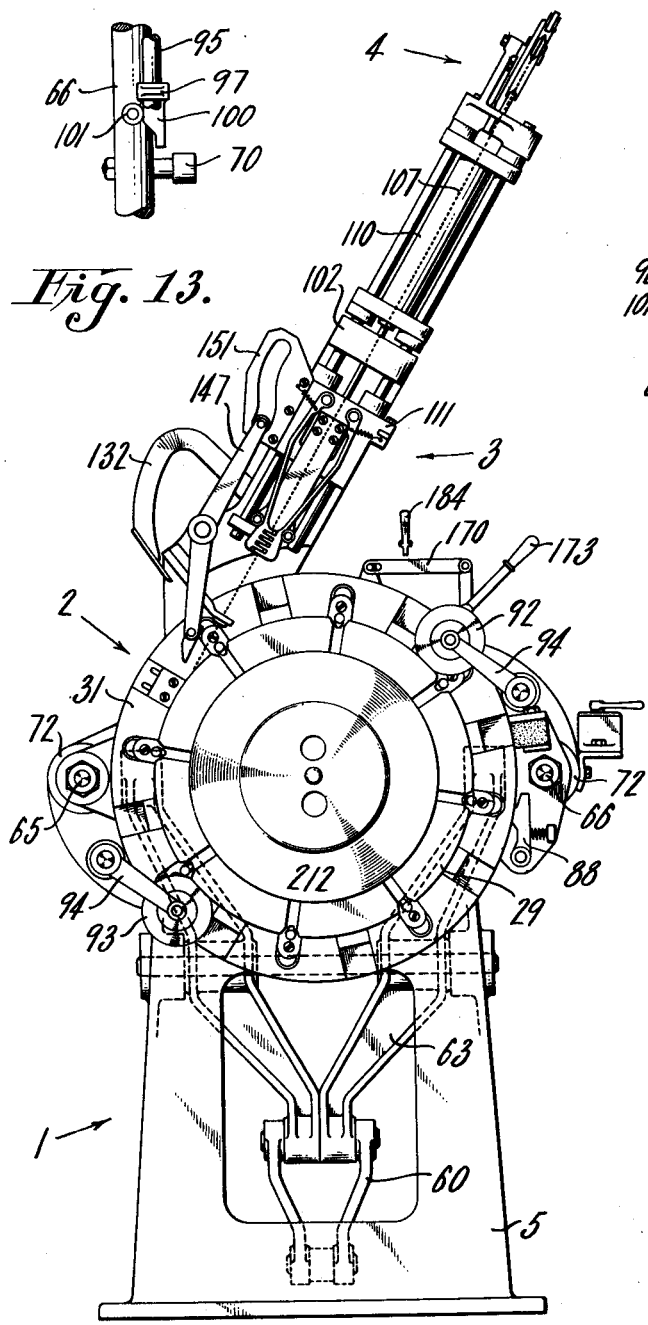
Fig. 1.
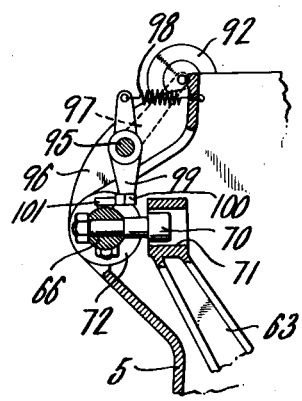
Fig. 13.
Fig. 12.
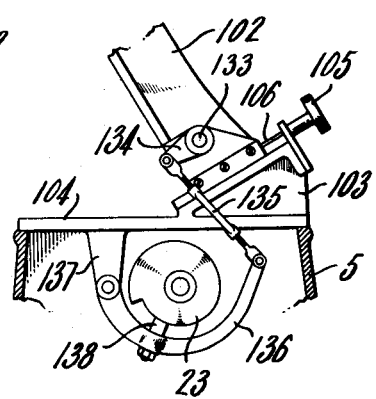
Fig. 14.
INVENTOR.
GEORGE F. WIKLE
BY
ATTORNEYS.

June 26, 1934.  G. F. WIKLE  1,964,445
BEAD FORMING APPARATUS
Filed March 6, 1933  6 Sheets-Sheet 2

INVENTOR.
GEORGE F. WIKLE
BY
ATTORNEYS.

June 26, 1934.  G. F. WIKLE  1,964,445
BEAD FORMING APPARATUS
Filed March 6, 1933   6 Sheets-Sheet 3
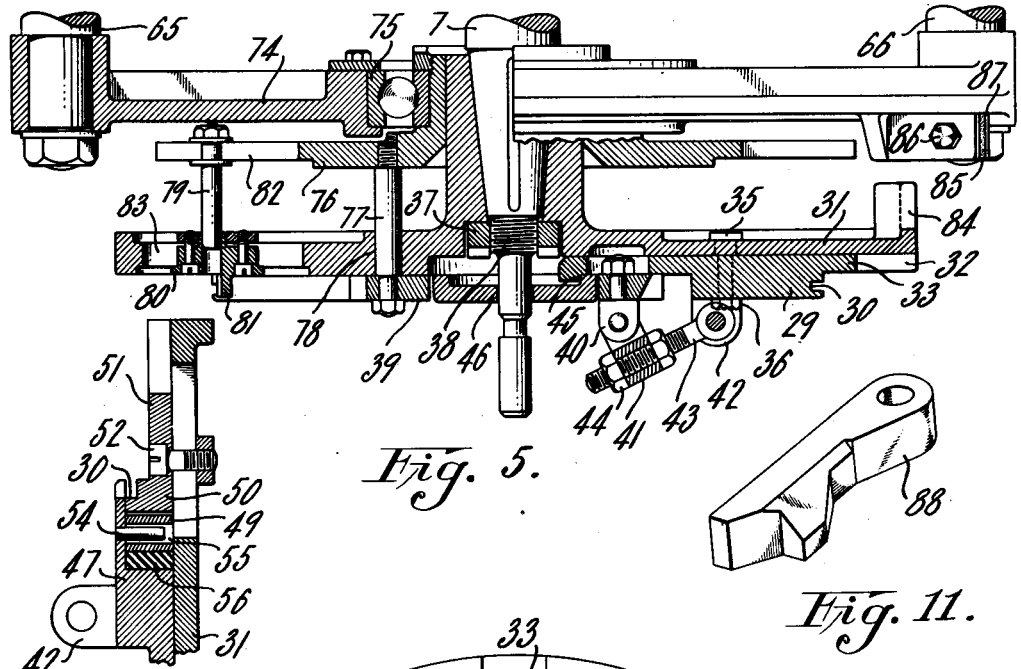
Fig. 5.
Fig. 11.
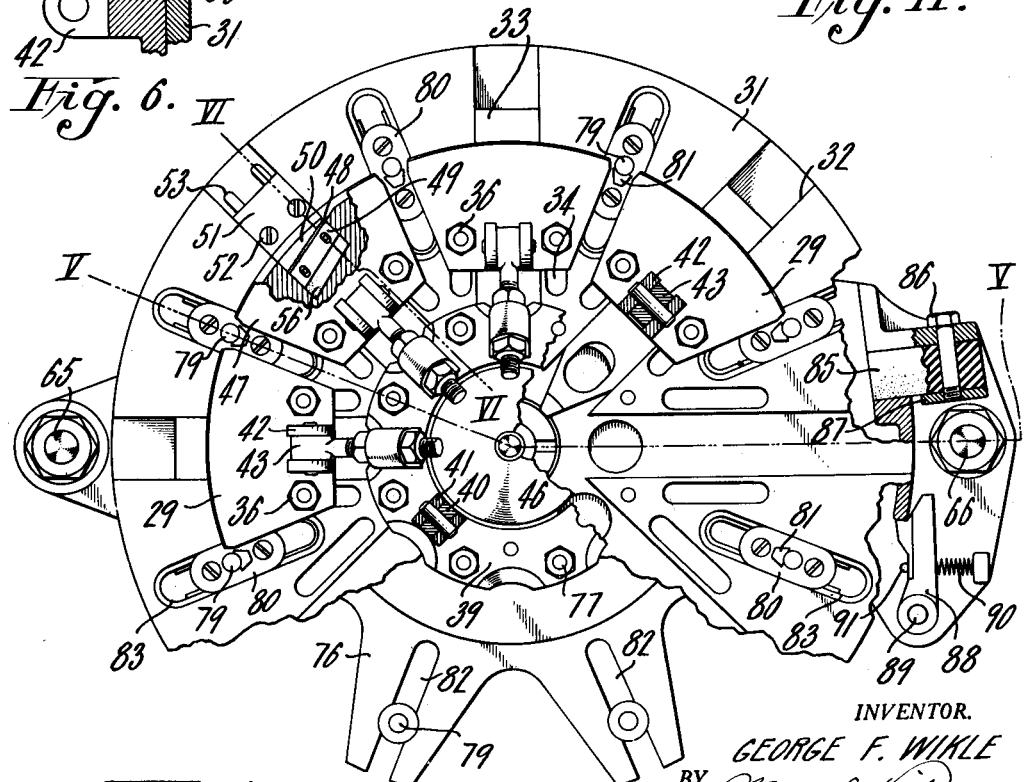
Fig. 6.
Fig. 4.
INVENTOR.
GEORGE F. WIKLE
BY
ATTORNEYS.

June 26, 1934.    G. F. WIKLE    1,964,445
BEAD FORMING APPARATUS
Filed March 6, 1933    6 Sheets-Sheet 4

INVENTOR.
GEORGE F. WIKLE
BY
ATTORNEYS.

Patented June 26, 1934

1,964,445

UNITED STATES PATENT OFFICE 1,964,445

BEAD FORMING APPARATUS

George F. Wikle, Detroit, Mich., assignor to United States Tire Company, Incorporated, Detroit, Mich., a corporation of Indiana Application March 6, 1933, Serial No. 659,691

8 Claims. (Cl. 140—92.2)

My invention relates to winding mechanisms, and in particular to apparatus for forming bead rings used in pneumatic tires.

Generally, the apparatus consists of means for feeding a rubber insulated strand of wire on to a reel, clamping the end thereof, winding the wire in a plurality of convolutions, cutting the opposite end, and ejecting the completed annulus from the apparatus.

The present invention is an improvement to that of the Alian application Serial No. 628,357, filed August 11, 1932. It is also particularly applicable to the single strand wires disclosed in a previous patent application of Abbott, Serial No. 543,612, filed June 11, 1931, reference to which may be made for a more complete description of the bead ring described herein.

I provide a winding head which prevents injury to the bead ring rubber covering for the reason that the ring does not slide off the winding reel during the ejecting operation. I further provide automatic means for braking and controlling the movement of the single strand wire before it approaches the winding reel.

Among the objects and advantages of my invention is to provide a machine which is completely automatic with the resultant characteristics of speed in production, economy in operation, and uniformity of finished product.

Other objects and advantages will become apparent in the following detailed description when considered in connection with the accompanying drawings, in which:

Fig. 1 is a front elevational view of the complete apparatus;

Fig. 4 is a front elevational view, partly in section, of the winding head;

Fig. 5 illustrates a plan view thereof, partly in section, looking in the direction of lines V—V of Fig. 4;

Fig. 6 is a detailed view, in section, looking in the direction of lines VI—VI of Fig. 4;

Fig. 11 is a perspective view of the winding reel latch lock;

Fig. 12 is a rear elevational view, partially in section, of the mechanism for causing the axial movement of the winding flange;

Fig. 13 is a plan view of a portion thereof;

Fig. 14 illustrates a rear view of a portion of the wire cutting mechanism;

Figures 2, 3:
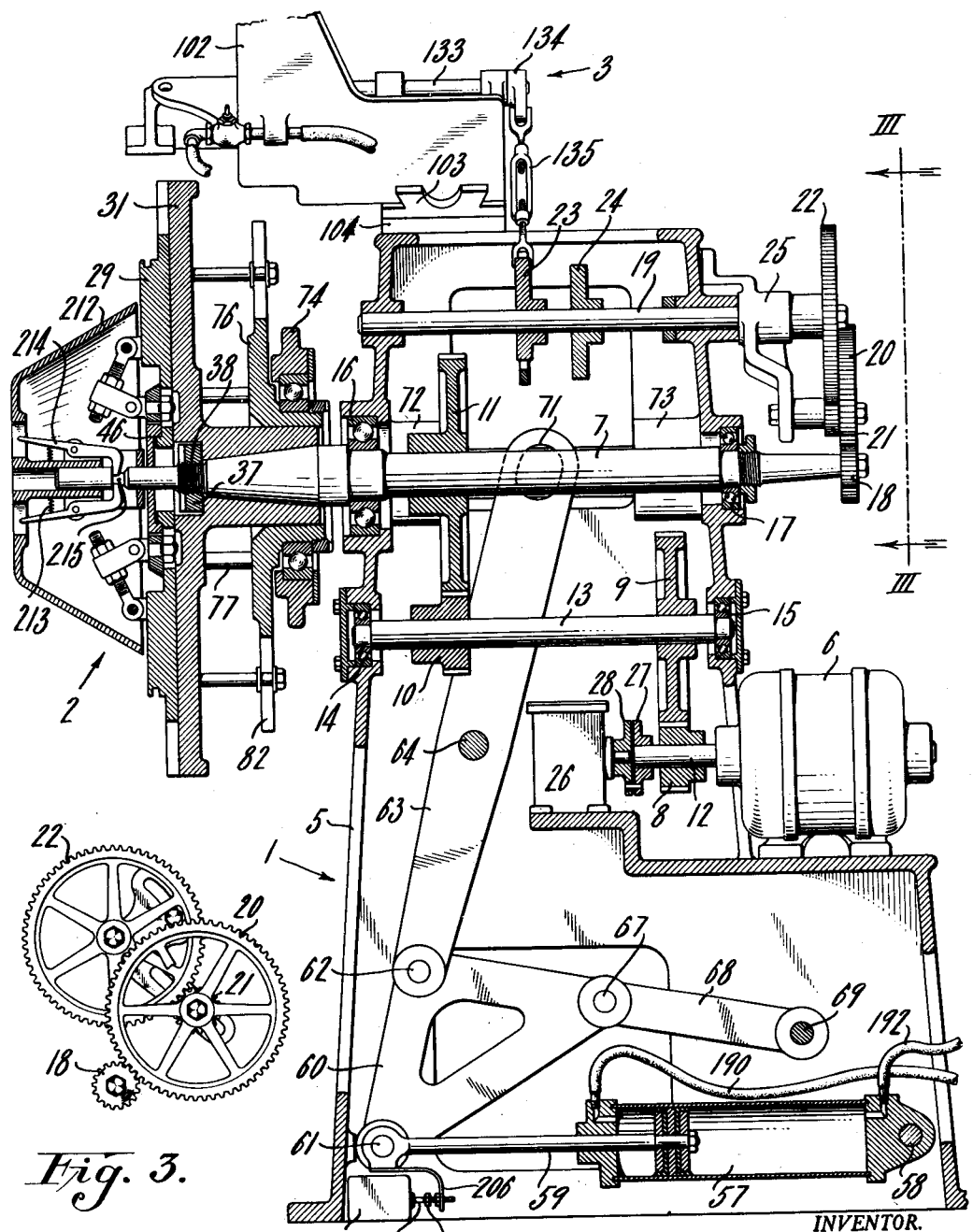
Fig. 2 is a sectional side elevational view thereof.
Fig. 3 illustrates in detail the cam shaft timing gears, looking in the direction of lines III—III of Fig. 2.

Referring to Fig. 1, there is shown a side view of the apparatus which comprises a base portion 1 of the apparatus that carries a driving mechanism and mechanism for causing the axial movement of the winding head; a winding head 2 on which the annular bead rings are wound; a feeding and cutting mechanism 3 co-operating with the winding head; and mechanism 4 for braking and controlling the movement of the single strand wire before it approaches the winding head 2. The entire mechanism is supported by a framework 5, constituting a part of the base portion 1, which retains the component elements in convenient relation for the operator.

Driving mechanism

The driving mechanism is particularly illustrated in Fig. 2. It comprises a motor 6 connected to a horizontally disposed main shaft 7 by a train of gears 8, 9, 10 and 11. The gear 8 is mounted on motor shaft 12, and the gears 9 and 10 are keyed to a countershaft 13 mounted in bearings 14 and 15 retained in a housing of the main frame 5.

The main shaft 7, on which gear 11 is keyed, is supported from the frame by roller bearings 16 and 17. A gear 18, also keyed to shaft 7, drives a cam shaft 19 through gears 20, 21 and 22, shown in detail in Fig. 3. The cam shaft carries a knife operating cam 23 and a cylinder operating cam 24. A bracket 25 supports gears 20 and 21 in such manner that different sized gears may be employed to effect different speeds for different sizes of bead wires.

Motor shaft 12 couples with an inertia relay 26 by means of flanges 27 and 28. The purpose of this relay will be hereinafter described.

Winding mechanism

Figs. 2, 4, 5, 16, 17 and 18 illustrate particularly the winding head and operating mechanism for coiling the wire into an annulus. It comprises principally a plurality of segments 29 arcuated and grooved on their outer peripheries so as to form in combination, and when in extended position, a concentric groove 30 into which the wire is wound. Each segment is mounted on a disc flange 31 in a radially slidable manner. The disc flange is provided with radial slideways 32 (Fig. 4). Cooperating with these slideways are slide blocks 33 which form an integral part of the segments 29. Slots 34 in the disc flange 31 engage with studs 35 attached to the segments 29 by nuts 36 so that the segments 29 are restricted to radial movement only.

Figure 16:
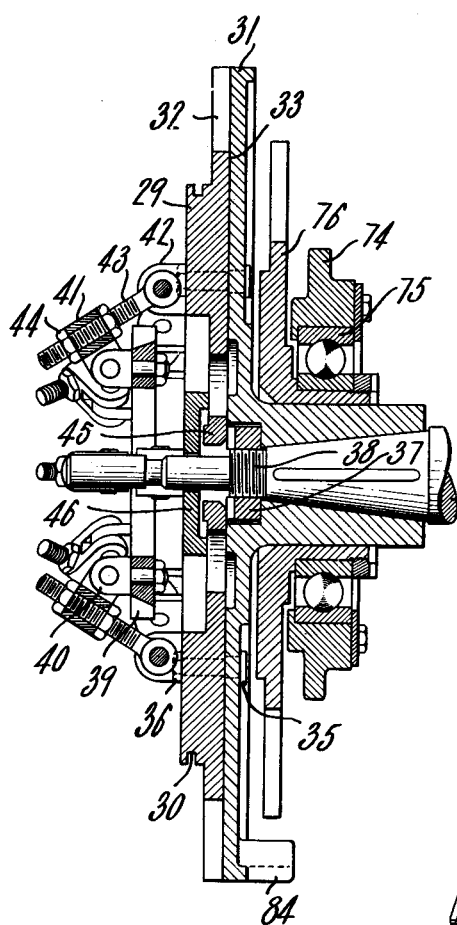
Fig. 16 is a cross sectional view of the winding head in its collapsed position.

The purpose of the radial movement of the segments 29 is that they may be positioned in expanded concentric relation during the winding operations, and may be radially drawn inwardly during the ejecting operations as shown by a comparison of Figs. 5 and 16.

Disc flange 31 is keyed to the main shaft 7 and rigidly held thereto by a nut 37 co-operating with threads 38 positioned near the end of the shaft 7. Radial movement of the segments 29 is effected by horizontal movement of a ring 39 located inwardly of, and on an even plane with the segments. Lug members 40 project from the ring 39 and each in turn pivotally engages with a threaded block 41. A pair of lugs 42, forming a part of the segments 29, pivotally retain a threaded link 43 which in turn engages with the threaded block 41. Hex nuts 44 threaded on to the link 43 and positioned on each side of the block 41 securely lock the block and link together. The purpose of the threaded engagement between the block and link is to provide adjustability so that different diameter bead rings may be produced by the same apparatus.

The inner end of the slide block 33 is enlarged so as to form a shoulder 45. This shoulder co-operates with a complementary shoulder or a washer 46 so as to limit the outward radial movement of the segments 29.

As shown in Figs. 4 and 6, one of the segments 47 is provided with means for gripping the end of the single strand wire. When a single strand of wire is in receptive position for the winding mechanism, the segments are withdrawn inwardly so that a gap 48 is open to receive the end of the wire. The gap opens into the bottom of groove 30 and is formed in part by a lower jaw 49 loosely carried by the segment 47 and an upper jaw 50. The upper jaw forms in part the bottom of the concentric groove 30, and is integral with a plate 51 rigidly clamped to the disc flange 31 by means of screws 52. Slots 53, forming radial runways for the screws 52, have for their purpose to adjust the upper jaw 50 according to the preferred diameter of bead rings. Lower jaw 49 is attached to segment 47 by a pin 54 projecting into an elongated hole 55 in the jaw 49. A cushioning block of rubber 56 is positioned between the jaw 49 and the segment 47 in such manner that the wire will not be crushed but will be gripped firmly between the jaws. Gap 48 is so positioned that it extends substantially in the direction of the wire which is being fed to it.

In order to grip the wire, the ring 39 is axially moved inwardly from the position shown in Fig. 16 to that shown in Fig. 2. The result of this movement is that the segments move outwardly by the action of block 41 and link 43 to form a concentric periphery and to thus close the gap 48. This movement acts to grip the end of the wire in readiness for the winding operation.

After a proper number of coils are wound into the groove 30, the ring 39 is horizontally actuated outwardly, the segments move radially inwardly, and the completed annulus is simultaneously ejected as hereinafter described.

Means for axial movement of the ring 39 is provided by an air cylinder 57 pivoted to the frame 5 at 58, as shown in Figs. 1 and 2. The piston rod 59 of this cylinder connects with a compound leverage system. A triangular floating lever 60 connects at one of its pivots 61 to the piston rod 59. A second pivot 62 joins a bifurcated arm 63 which is pivoted at its center 64 and transmits horizontal movement to the rods 65 and 66. A third pivot 67 of the triangular lever joins a link 68 pivoted to the frame at 69.

Referring to Figs. 12 and 13, each half of the upper end of the bifurcated arm 63 contacts with a stud 70 fastened to rods 65 and 66, respectively. Lever openings 71 for engaging the studs 70 are vertically elongated to compensate for the radial movement of the arm 63. The horizontal actuatable arms 65 and 66 are slidable in bearings 72 and 73 projecting from the frame 5. Connecting the rods 65 and 66 (Fig. 5) is a plate 74 carrying a roller bearing 75. This bearing is also attached to the hub of a spider 76 so that the spider is rotatable in relation to the plate 74. The spider is also horizontally slidable on the hub of the disc flange 31. Studs 77 rigidly hold the spider and the ring 39 in angular spaced relation. These studs are horizontally slidable within apertures 78 in the disc flange, and at the same time transmit rotary motion from the disc flange to the spider.

Figure 17:
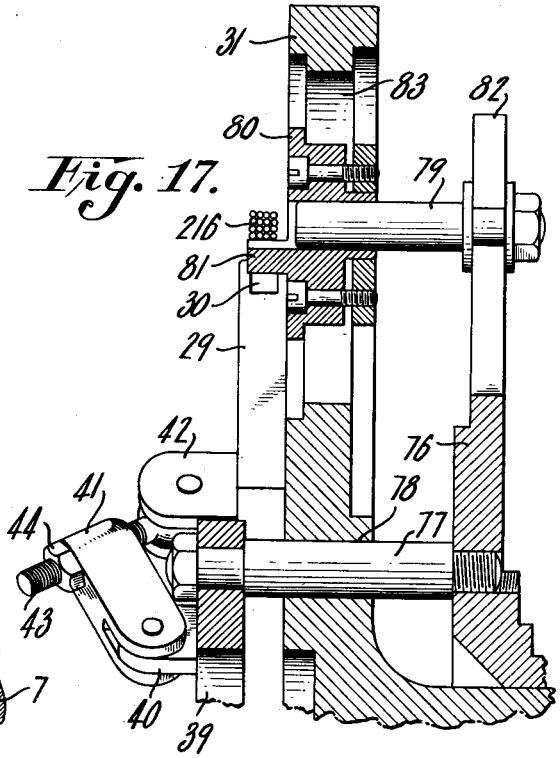
Fig. 17 is an enlarged sectional view of a portion of the bead wire ejecting mechanism in an intermediate position.
Figure 18:
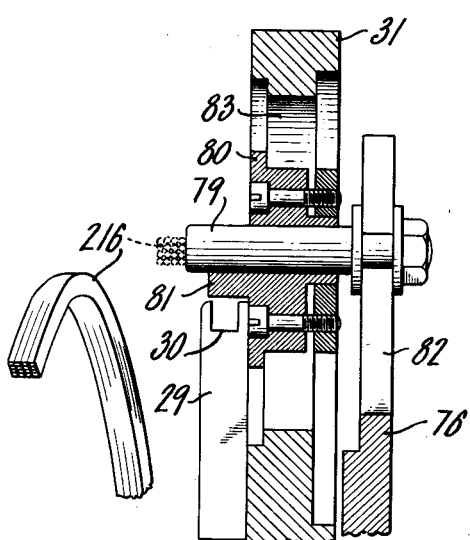
Fig. 18 is a cross sectional view of a portion of bead winding mechanism in its ejecting position.

Horizontal movement of rods 65 and 66 carries with it plate 74 and spider 76. This movement brings ejector pins 79 into action to expel the completed annulus from the apparatus, as shown in Figs. 17 and 18. A plurality of these pins 79 are disposed between the segments 29 in alignment with the groove 30. Each of these pins extends through a block 80 radially slidable in the flange 31 and spider 76 for adjustment purposes, but normally attached rigidly to the spiders 76.

Projections 81 extend from blocks 80 so as to form in part the bottom of the groove 30 between the segments 29. When the segments are radially withdrawn, the projections 81 operate to retain the annulus until same is ejected off the projections. As the bead wire annulus is temporarily suspended only by the projections 81, and as the ejector pins operate simultaneously with radial movement of the segments, the ejector pins engage with and expel the annulus from the winding head. Slots 82 and 83 in the spider 76 and disc flange 31, respectively, provide adjustable means for radially moving the ejector pins according to the diameter of the bead wire annulus.

Means are provided for stopping the rotating disc flange which carries the segments at a given point so that the wire gripping portion of the segments will come into alignment with the wire feeding mechanism. This means consists in part of electrical apparatus for cutting off the motor circuit as hereinafter explained. In addition to this, means are provided for mechanically stopping the disc flange at a definite point. As shown in Figs. 4 and 5, a lug 84 projects from the disc flange 31 so that when the plate 74 is moved outwardly this lug strikes a cushioning block 85, mounted on the plate 74 by a bolt 86 and threaded washer 87. The cushioning block 85 absorbs the shock of the impact, while at the same time a locking latch 88 also mounted on the plate 74 engages the lug 84 and retains it in locked position. The locking latch 88 is pivoted at 89 and held in place by a spring 90 which urges the locking latch against a stop pin 91. Due to the rotary movement of the disc flange and the simultaneous axial movement of the latch, the latch as shown in Fig. 11, is provided with a two-directional bevel for engagement with the lug 84. Both the cushioning block 85 and the locking latch 88 come into engagement with the lug 84 only when the plate 74 is moved outwardly by the horizontal actuation of rods 65 and 66.

As the wire is being wound on to the winding head, rollers 92 and 93, as shown in Figs. 1 and 12, bear with pressure against the wire as the coil is being formed within the groove 30. This insures that the wires will be compactly coiled, and assists in causing the adjacent convolutions to adhere to each other. As shown particularly in Figs. 12 and 13, the roller 92 is supported from an arm 94 keyed to shaft 95 mounted in bearings in an extended portion 96 of the frame 5. An arm 97 also keyed to shaft 95 provides leverage for a spring 98 which urges the roller 92 to bear against the coils within the groove 30.

When the bead annulus is ejected, it becomes necessary to remove the rollers 92 and 93 out of the way. This is accomplished by an arm 99 keyed to shaft 95 and having a cam 100. This cam is so situated that it engages with a roller 101 attached to the slidable rod 66. Accordingly, horizontal movement of this shaft operates to swing the roller 92 in or out of engagement with the groove 30, depending on the axial position of the plate 74. The roller 93 operates in the same way by movement of the rod 65.

Feeding mechanism

Figure 8:
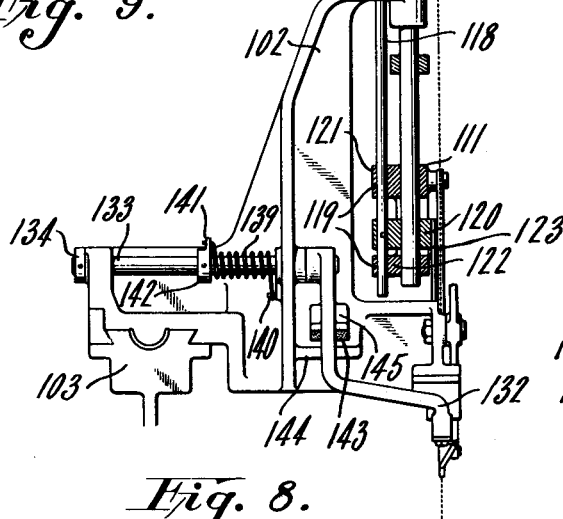
Fig. 8 is a side view thereof, partly in section.
Figure 7:
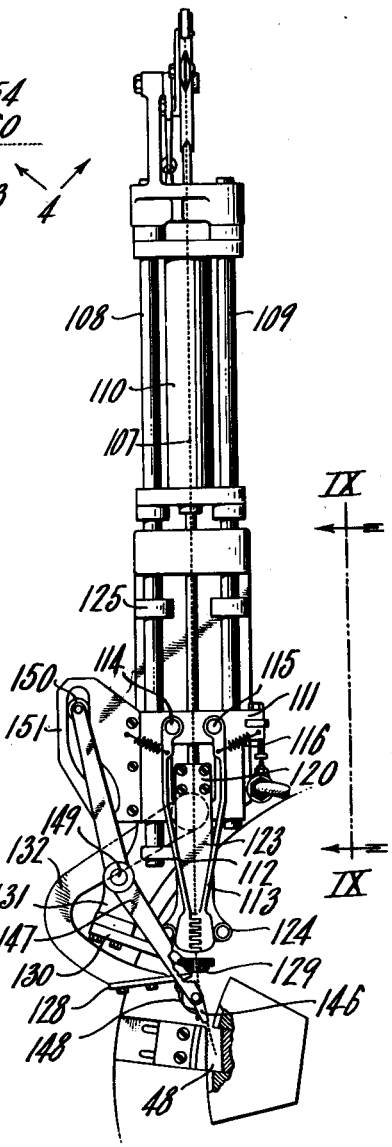
Fig. 7 is a front elevational view of the cutting and feeding mechanism.

Referring particularly to Figs. 2, 7 and 8, the feeding and cutting mechanism 3 is supported by a frame 102 joined to a dovetail slide block 103, an integral part of the plate 104, fastened to the frame 5. As shown in Fig. 14, means is provided to move the frame 102 for adjustment. Movement may be effected by turning a hand wheel 105 which connects the frame 102 with a threaded shaft 106. The purpose of this adjustment is to position the feeding of the single strand wire 107 in tangential relation with the winding head.

The frame 102 supports two parallel guide rods 108 and 109 which act as slideways for the feeding mechanism. The frame also supports an air cylinder 110.

Figure 10:
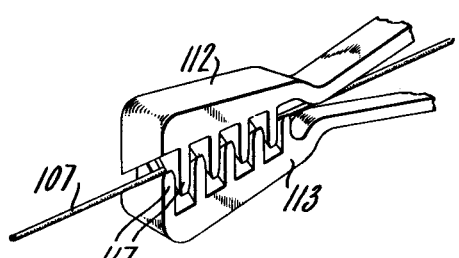
Fig. 10 illustrates a perspective view of the wire clamping jaw.

A slide block 111, slidable on rods 108 and 109, carries a pair of jaws 112 and 113 for clamping the wire 107, as particularly shown in Figs. 7 and 8. These jaws 112 and 113 are pivotally attached to the slide block 111 by means of pins 114 and 115 respectively, and are normally separated by the action of springs 116. As shown in Fig. 10, each jaw carries a plurality of teeth 117 alternately beveled at opposite angles so that the two jaws complementarily interfit to form a guiding and gripping means for the wire 107. Piston rod 118, slidable in operatures 119 of the slide block 111 (Fig. 8), attaches to a bear 120 having a limited movement relative to lugs 121 and 122 projecting from the slide block 111. The bar 120 carries a plate 123 which in turn carries cam rollers 124 for co-operative engagement with cam surfaces on the jaw heads 112 and 113. Stop collars 125 on the rods 108 and 109 limit the upward movement of the slide block 111.

As the piston rod 118 moves downwardly, the cam rollers 124 engage the cam surfaces of the jaws 112 and 113 thereby causing the jaws to firmly grip the wire 107. Through the continued movement of the piston rod 118 the contact of the cam rollers 124 with the jaws 112 and 113 couples the piston rod 118 with slide block 111 so as to cause the latter to move downwardly with the piston rod, thus clamping the wire 107 and carrying same towards the winding head gripping mechanism.

Connection 126 provides an inlet to the air cylinder for disengaging the jaws 112 and 113 from the wire 107. Connection 127 provides means for lowering the piston, gripping the wire, and feeding same to position for engagement by the winding head.

Cutting mechanism

When the proper number of convolutions are wound in the groove, 30, the cutting mechanism comes into operation to sever the wire 107. This comprises a shearing blade 128 and a shear bushing 129. The bushing is retained within a bracket 130 attached to the projection 131 extending from the frame 102. The bushing is positioned in axial alignment with the wire as it is fed into the gap 48, and the wire passes therethrough. Blade 128 is attached to a shearing arm 132 and is positioned so as to shear the wire at a point where it emerges from the opening in the bushing 129.

As particularly shown in Figs. 2, 8 and 14, arm 132 is keyed to a shaft 133 mounted in bearings in the frame 102. At the opposite end of this shaft a lever 134 pivotally attaches to a turnbuckle 135, which in turn connects with a cam lever 136. The cam lever is hinged to a bracket 137 extending from the plate 104. Actuation of the shearing arm is then effected by movement of the cam 23 which engages the cam lever 136 through a cam rider or follower 138. In order to insure a quick movement of the arm 132 so as to produce a shear, a torsional spring 139 is positioned about the shaft 133. One end of this spring attaches to a peg 140 projecting from the frame 102, and the other end engages with a projection 141 on a collar 142 pinned to the shaft 133.

In the shearing operation it becomes necessary for the blade 128 to completely pass the hole in bushing 129, and then quickly return so as to allow the wire to continue to pass through the bushing. This is accomplished by a stop pad 143, preferably composed of rubber. The pad is retained by a bracket 144 extending from the frame 102. Flanges 145 extending from the shearing arm form a flat surface for engagement with the stop pad 143. The pad is positioned so that it will normally retain the shearing blade out of engagement with the shear bushing aperture, but due to the force of the shearing arm caused by the torsional spring the stop pad 143 will compress sufficiently to allow the shearing blade 128 to pass the aperture in the bushing and complete the shear.

Wire guiding mechanism

In starting a new annulus it becomes necessary to guide the end of the wire so that it will be in a receptive position for the clamping jaws at the gap 48. A guide shoe 146 having a slot for the passage of the wire is pivotally attached to a guide arm 147. A spring 148 attaches to the arm 147 and normally urges the shoe in proper guiding position. This spring and the pivot on the shoe are necessary for the reason that the winding head begins to rotate after the wire is grasped and before the arm 147 is out of the way. The effect is that the segments 29 may strike the shoe, but being pivoted the shoe is merely forced out of the way and the wire escapes through the slot as shown in Fig. 1.

The guide arm 147 is hinged at about its center on a pin 149 mounted on the frame 102. Opposite the shoe end of the arm 147 there is a cam roller 150. This roller engages with a cam 151 connected to the movable slide block 111. Actuation of the slide block by the piston 118 carries with it the cam 151 which moves the shoe 146 inwardly or outwardly of the groove 30, depending upon the position of the elements in the operation.

Wire braking mechanism

In intermittent operations the wire is rapidly drawn on to the winding head, stopped, and severed. Accordingly, due to the momentum of the wire, it is necessary to provide means for automatically stopping movement of the wire directly after it is severed. This mechanism 4 is particularly shown in Figs. 1, 7 and 8.

A bracket 152, attached to the upper ends of the rods 108 and 109, contains an upright member 153 which pivotally connects with an arm 154. The opposite end of the arm 154 supports a sheave 155. This sheave and its supports are positioned so that the single strand wire 107 as looped therearound contacts with the sheave for a distance substantially equal to three-fourths of the circumference of the sheave. A slight angular offset of the sheave prevents the horizontal wire from contacting with the vertical wire as they cross one another, as shown in Fig. 8.

A brake band 156 attaches to one end of the bracket 152, follows in part along the outer periphery of the sheave, and pivotally attaches to a lever 157 which, in turn, is pivotally connected to the arm 154. A brake lining 158 is fastened to the brake band and fits partially within the groove of the sheave 155. At about the center of the lever 157 a wheel 159 is rotatably attached. This wheel is beveled so that it will fit within the groove of the sheave 155 and bear against the wire at the bottom of the groove.

An extension 160, extending downwardly from the arm 154, joins with a spring 161 connected at its other end to a lug 162 projecting from the bracket 152.

The mechanism as thus described, through the action of the spring 161 normally operates to provide a braking effect against the sheave 155. The wheel 159 co-operates with the brake band 156 so that when the brake is applied the wheel is pressed firmly against the wire, preventing same from loosely slipping around the groove in the sheave. During the winding operation the wire is being drawn on to the winding head. Accordingly, there is a downward pull on the wire which causes the arm 154 to swing downwardly, and to thus free the sheave from the braking application, at the same time allowing the wheel 159 to ride loosely within the groove of the sheave. As soon as the wire is severed, the downward pull is cut off and the spring 161 immediately reacts to swing the sheave into braking position.

Valve actuating and control mechanism

Figure 15:
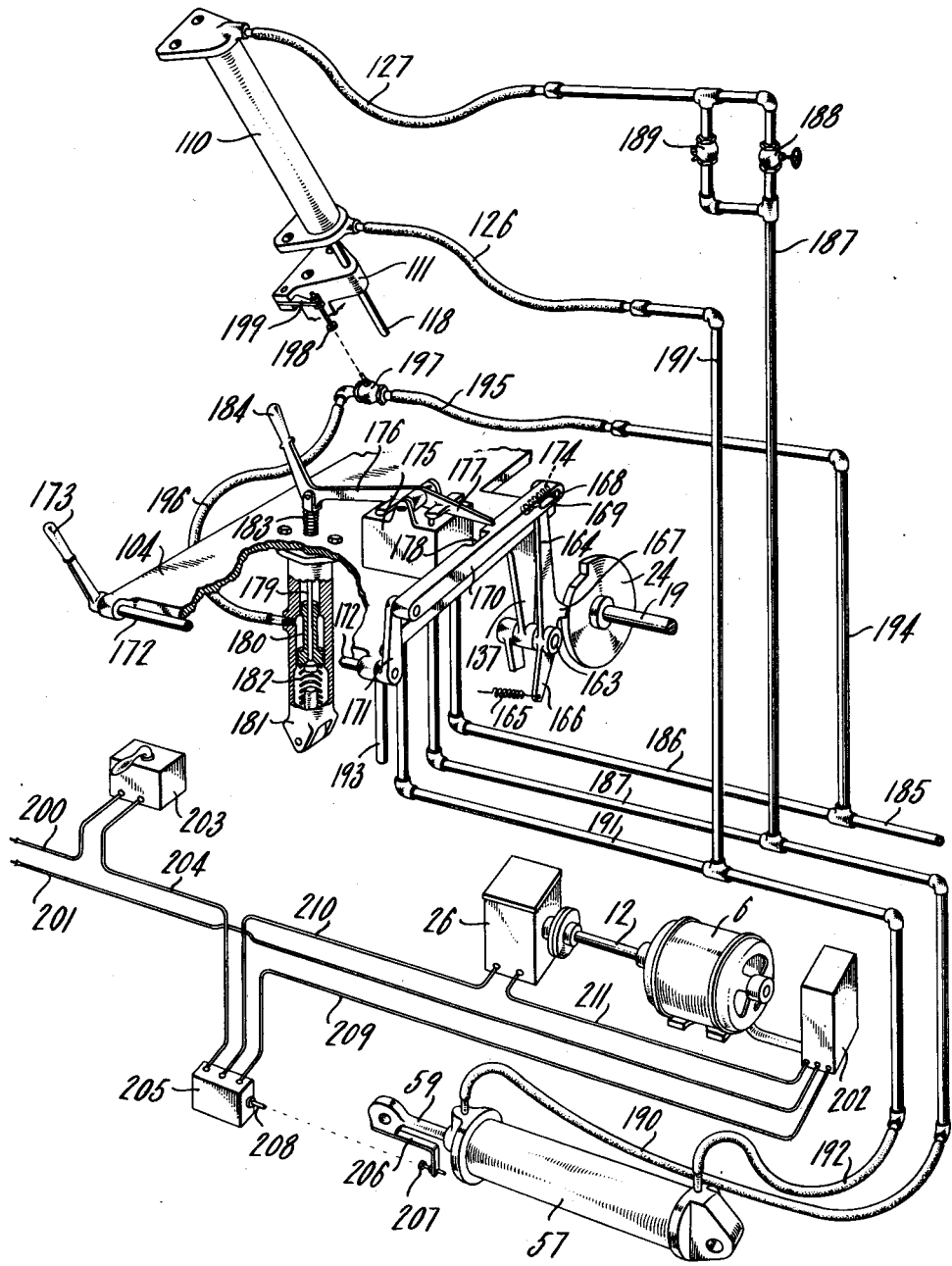
Fig. 15 is a diagrammatic view of the piping and electrical connections, together with the actuating elements for controlling the automatic operation of the apparatus.

Referring to Figs. 1 and 15, the entire fluid pressure lines are controlled by the cylinder operating cam 24. The bracket 137 extending from the plate 104 provides a pivot 163 on which a cam arm 164 is mounted. A spring 165 connects an extension 166 of the cam arm to the side of the frame 5, thus retaining a cam projection 167 in engagement with the cam 24.

A pin 168 extends from the upper end of the cam arm 164 and engages in a slot 169 in a valve control bar 170. The opposite end of this bar is pivotally supported by an arm 171 connected to a shaft 172 mounted in bushings extending from the plate 104. A hand lever 173 is also mounted on this shaft so that manual operation of the valve may be accomplished if so desired, particularly in starting the apparatus. The purpose of the slot 169 is to enable manual operation of the hand lever 173 without interfering with the automatic control by the cam arm 164.

A spring 174 positioned within the bar 170 normally retains the pin 168 of the cam arm at one end of the slot 169. A double acting conventional vlave box 175, commercially known as the Ross valve, is positioned on top of the plate 104, and has co-operating valve control arms 176 and 177. The arm 177 is held in raised or inoperative position by resting on the valve control bar 170. An indentation 178 in the bar permits the arm 177 to be lowered for operation of the cylinders 57 and 110, depending on the position of the valve control bar 170. The arm 176, integral with the arm 177, is pivotally connected to a piston rod 179. The piston rod connects loosely with a piston 180 vertically operable in a cylinder 181. This device is known as a leak cylinder or dash pot, and has for its purpose to hold one set of valves open for a given length of time. When the piston 180 is forced downwardly, a fluid pressure is introduced above it and the pressure gradually escapes as a compression spring 182 forces the piston back to its normal position in a given length of time. A second spring 183 circumscribing the piston rod at the upper end and above the plate 104 normally urges the lever 177 into valve operating position unless restrained by the valve control bar 170.

Hand lever 184 forms a continuation of the arm 176 so that, in conjunction with lever 173, manual operation of the valves may be accomplished.

Pipe line 185 is connected to a supply source of fluid pressure (not shown), and communicates with the valve box 175 by a pipe line 186. From the valve box, pipe line 187 connects with flexible hose 127 attached to the upper end of cylinder 110. Intercepting the pipe 187 and the hose 127 is a valve 188 which has for its purpose to control the flow of fluid pressure so that actuation of cylinders 110 and 57 will be equalized and will operate simultaneously. A check valve 189 by-passing the valve 188 enables a free and quick flow of the fluid pressure within cylinder 110 when the piston therein is being withdrawn. Pipe 187 also connects with cylinder 57 by means of the connecting hose 190 attached to the front end of the cylinder. Reverse movement of the pistons in these cylinders is effected by means of pipe line 191 extending from the valve box and connected to cylinder 110 through a flexible hose 126 and to the cylinder 57 through a connecting hose 192.

A short pipe 193 is an exhaust line extending from the valve box.

From the supply line 185, dash pot 181 is operable by fluid pressure passing through pipe 194 and flexible hose lines 195 and 196. A valve 197 positioned between the hose line 195 and 196 provides means for controlling the dash pot 181. This valve is automatically actuated, depending upon the movement of the piston in cylinder 110. An adjustable contact bolt 198 for engaging with the valve 197 is suspended from an arm 199 projecting from the slide block 111.

Electrical actuating control

In synchronism with the fluid pressure means a group of electrical switches operate to start and stop the motor 6 in proper sequence. Wires 200 and 201 are connected to a source of electricity. Wire 201 runs directly to the motor starting box 202. Wire 200 runs first to a hand starting switch 203 and thence through wire 204 to an automatic switch 205. This automatic switch is controlled by movement of piston rod 59 in cylinder 57. The piston rod 59 supports a bracket 206 from which an adjustable contact screw 207 is attached. The contact screw is positioned in alignment with the switch pin 208 of the automatic switch so that it will strike the pin when the piston rod 59 is in extended position. The wire 209 connects the starting box 202 and the automatic switch 205. This wire completes a circuit with wire 204 within the automatic switch when the motor is in running operation.

When it is desired to stop the motor, automatic means provides a practically instantaneous brake. This is effected by means of a third wire 210 which joins with wire 204 within the automatic switch 205 when the contact is broken between wires 204 and 209. Wire 210 joins with the inertia relay 26, thence through wire 211 to the motor reverse operating coils within the starting box 202. This method of stopping the motor is commonly referred to as "plugging", and the inertia relay 26 is generally referred to as a "zero switch." Its object is to complete the reverse contact between wires 210 and 211 after the circuit interrupting operation of switch 205 and as long as the motor is in running operation. As soon as the motor ceases to rotate, the contact between wires 210 and 211 is broken and the entire electrical system remains at rest until the automatic switch 205 is again operated to start the motor through movement of the piston rod 59.

Operation

In operation the single strand bead wire 107, extending from a source such as a supply reel and/or coating apparatus (not shown), is positioned so that the wire is looped around the sheave 155 and extends in parallel relation with the feeding mechanism 3 (Figs. 1 and 8). The wire passes between the jaws 112 and 113, and is threaded through the shear bushing 129, after being cut to the proper length for the start.

Initial manual operation of the hand levers 173 and/or 184, and thereafter, rotation of the timing cam 24 permits the valve arm 177 to drop into the indentation 178 of the valve control bar 170.

Through the spring 183 the valves are caused to function so as to set cylinders 110 and 57 in piston extending operation. The piston in cylinder 110 moves downwardly, causing the wire to be held tightly by the clamping jaws 112 and 113, and to be carried downwardly a distance equal to the length of the stroke of piston 118. The wire, formerly ending at the edge of the shear bushing 129, now strikes guide shoe 146 and the wire is deflected into the gap 48 formed by the clamping means of the winding head. The cam 151, through the arm 147, places the shoe 146 in proper guiding position as the cam travels with the downward movement of the piston 118.

Figure 9:
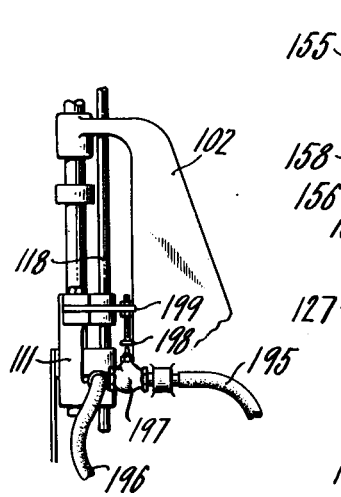
Fig. 9 is a detailed view as shown from the directional lines IX—IX of Fig. 7.

When the piston 118 reaches the end of its stroke, the contact bolt 198 (Figs. 9 and 15) strikes the valve 197, actuating the dash pot 181 to move the piston 180 downwardly against the springs 182 and 183, and setting the valves in operation to stop pressure flow to pipe line 187, and to cause a pressure flow in pipe line 191. This action causes the piston 118 to immediately reverse its stroke. The valve control arm 177 is now raised out of the indentation 178 and the valve control bar moves sideways so as to hold the valve control arm in this position. Shortly after this, the dash pot 181 loses its power to retain the arm 177 in elevated position, and for the next movement it is subject to the spring 183.

Simultaneously with the reverse movement of the piston in cylinder 110, cylinder 57 is set in operation so that the segments 29 expand and the clamping segment 47 is moved into position with the upper clamping jaw 50, with the result that the end of the wire is held tightly within the groove 30. When this occurs, the piston rod 59 in cylinder 57 is extended and the contact bolt 207 strikes the automatic switch pin 208. This action completes the circuit between wires 204 and 209, thus setting the motor 6 in operation.

As the wire is being wound into the groove 30, cam 23 gradually raises the shearing arm 132 until the cam rider 138 (Fig. 14) reaches the cam step-off. At this point the shearing arm, with the assistance of tortional spring 139, makes a quick downward movement and severs the wire. Immediately the tension is removed from the feeding wire, and spring 161 sets the braking mechanism into operation so that movement of the wire, due to its momentum, is brought to rest quickly and uniformly.

Simultaneously with the wire severing operation, cam 24 reacts to move the horizontal valve control bar 170 so that the valve actuating arm drops into the indentation 178, changing the control of the valves in box 175. Immediately both cylinders 110 and 57 begin to operate, the piston rod 118 being extended and the piston rod 59 being withdrawn.

The first slight receding movement of the piston 59 in cylinder 57 breaks the circuit within the automatic switch 205 between wires 204 and 209. At the same time, a circuit is made complete between lines 204 and 210 within the automatic switch. As a result of this hook-up, the reverse coils in the starting box react to "plug" the motor. The motor, however, does not reverse for the reason that as soon as it nearly stops rotating in its normal running direction a contact within the inertia relay 26 is broken, and the electrical apparatus remains at rest until further mechanical means and the fluid pressure system set it again into operation.

As the piston rod 59 in cylinder 57 continues to recede, the segments 29 are drawn inwardly by means of the connections between the segments 29 and the piston rod 59. Disc flange 31 carrying the segments 29, through its own momentum continues to rotate slowly after the electrical circuits are disconnected.

The spider 76 is now moved toward the disc flange 31 and further motion of the winding head is arrested by the lug 84 which strikes the cushion 85. The latch 88 then engages with the lug 84 to retain the disc flange 31 carrying the segments 28 in a definite, fixed position during the interval that it remains at rest.

The spider 76, carrying the ejector pins 79, in its forward movement engages with the completed bead wire annulus and expels it from the projections 81 on which the annulus is held after the segments 29 are drawn inwardly. As the segments move inwardly, the clamping jaw gap 48 is opened and the end of the wire is released. The annulus drops down by gravity and glances off a conical guard 212 (Fig. 2) covering the segment operating mechanism. Springs 213 and levers 214 cooperate with a narrowed section 215 of the shaft 7 so as to retain the guard 212 in its relative position. The finished bead wire is now either removed from the floor by an operator, or it may be carried away by a conveyor. The ends may be taped manually, if desired.

At this stage of the operation the feeding device 3 again moves the single strand wire forward. Valve 197 operates to reverse the pistons in their respective cylinders, and the apparatus continues in a similar cycle of operation.

While I have shown and described a present preferred embodiment of the invention and method of making the same, it is to be understood that the invention may be otherwise embodied and practiced within the spirit thereof and the scope of the appended claims.

Having thus described my invention, what I claim and desire to protect by Letters Patent is:

1. In a coiling machine, a winding head, means for feeding a strand of material to the head, means for severing the strand upon the completion of a coil, and braking means responsive to the tension in the strand and effective in advance of the feeding means.

2. In a coiling machine, a winding head, means for feeding a strand of material to the head, means for severing the strand upon the completion of a coil, and means positioned in advance of the feeding means and comprising a sheave about which the strand is bent and a cooperative brake element responsive to the tension in the strand for braking the strand.

3. A winding head comprising a rotatable disc, a plurality of relatively stationary and movable segments carried by said disc and constituting a winding channel, means for actuating the movable segments, and pins projectible axially of the channel and through the disc for discharging a coil supported by the stationary segments upon the withdrawal of the movable segments.

4. In a winding machine, a shaft, a disc carried by the shaft, relatively stationary and movable segments carried by the disc for forming a winding groove, a member mounted axially of said shaft, pivotal connections between the member and the movable segments, and means for imparting movement to said member axially of said shaft for actuating said movable segments into and from their groove forming positions.

5. In a winding machine, a shaft, a disc carried by the shaft, relatively stationary and movable segments carried by the disc for forming a winding groove, a member mounted axially of said shaft, pivotal connections between the member and the movable segments, means for imparting movement to said member axially of said shaft for actuating said movable segments into and from their groove forming positions, and means for discharging a completed coil from said stationary segments.

6. In a winding machine, a shaft, a disc carried by the shaft, relatively stationary and movable segments carried by the disc for forming a winding groove, a member mounted axially of said shaft, pivotal connections between the member and the movable segments, means for imparting movement to said member axially of said shaft for actuating said movable segments into and from their groove forming positions, and a housing for said member and connections carried by said shaft.

7. In wire feeding apparatus, a block movable axially of a strand of wire, jaws pivoted thereon, means for normally holding the jaws apart, cams carried by the block and movable axially thereof for closing the jaws, and means for actuating the cams and the block in sequence to control the opening and closing of the jaws.

8. In wire feeding apparatus, a movable block, jaws pivoted thereon, means for normally holding the jaws apart, cams engaging outer faces of the jaws for bringing them into gripping engagement, and a second block slidable within the first named block for actuating the cams upon movement relative to the first named block.

GEORGE F. WIKLE.